Figure 2A:
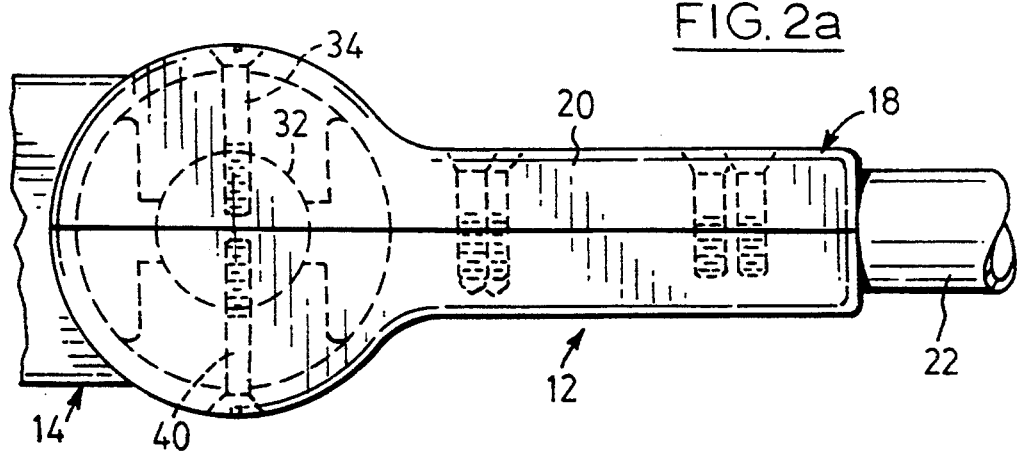

United States Patent [19]

Shepherd

[11] Patent Number: 5,364,058

[45] Date of Patent: Nov. 15, 1994

[54] SPRING-LOADED BRACKET

[75] Inventor: Charles G. Shepherd, Oakville, Canada

[73] Assignee: Metagal North America Ltd., Oakville, Canada

[21] Appl. No.: 134,761

[22] Filed: Sep. 30, 1993

[51] Int. Cl.5 ............................................. A47G 1/24
[52] U.S. Cl. ................................... 248/479; 248/900
[58] Field of Search ............... 248/479, 478, 480, 485, 248/486, 487, 900, 549; 359/875, 872

[56] References Cited

U.S. PATENT DOCUMENTS

| 503,243 | 8/1893 | Labudde et al. | |
|---|---|---|---|
| 1,883,506 | 10/1932 | Bommer | |
| 4,651,965 | 3/1987 | Vigna et al. | 248/478 X |
| 4,728,181 | 3/1988 | Kakinuma | |
| 4,733,846 | 3/1988 | Kakinuma | 248/479 |
| 4,854,539 | 8/1989 | Glue | 248/487 X |

Primary Examiner—Ramon O. Ramirez
Attorney, Agent, or Firm—Rogers & Scott

[57] ABSTRACT

A spring-loaded bracket includes a first part securable to a support, a second part mounted on the first part for angular movement relative thereto in opposite directions from a neutral position and a spring assembly biasing the second part to the neutral position. The spring assembly has a helical torsion spring carried by the first part and having first and second end portions at opposite ends. A first stop is carried by the first part to limit movement of the first spring end portion in a spring unwinding direction, and a second stop is carried by the first part to limit movement of the second spring end portion in a spring unwinding direction. Said second part has a first abutment engaging the first spring end portion so as to deflect the first spring end portion in a spring winding direction when the second part in moved angularly relative to the first part in one direction from the neutral position, and the second part has a second abutment engaging the second spring end portion so as to deflect the second spring end portion in a spring winding direction when the second part is moved angularly relative to the first part in the opposite direction from the neutral position.

2 Claims, 3 Drawing Sheets

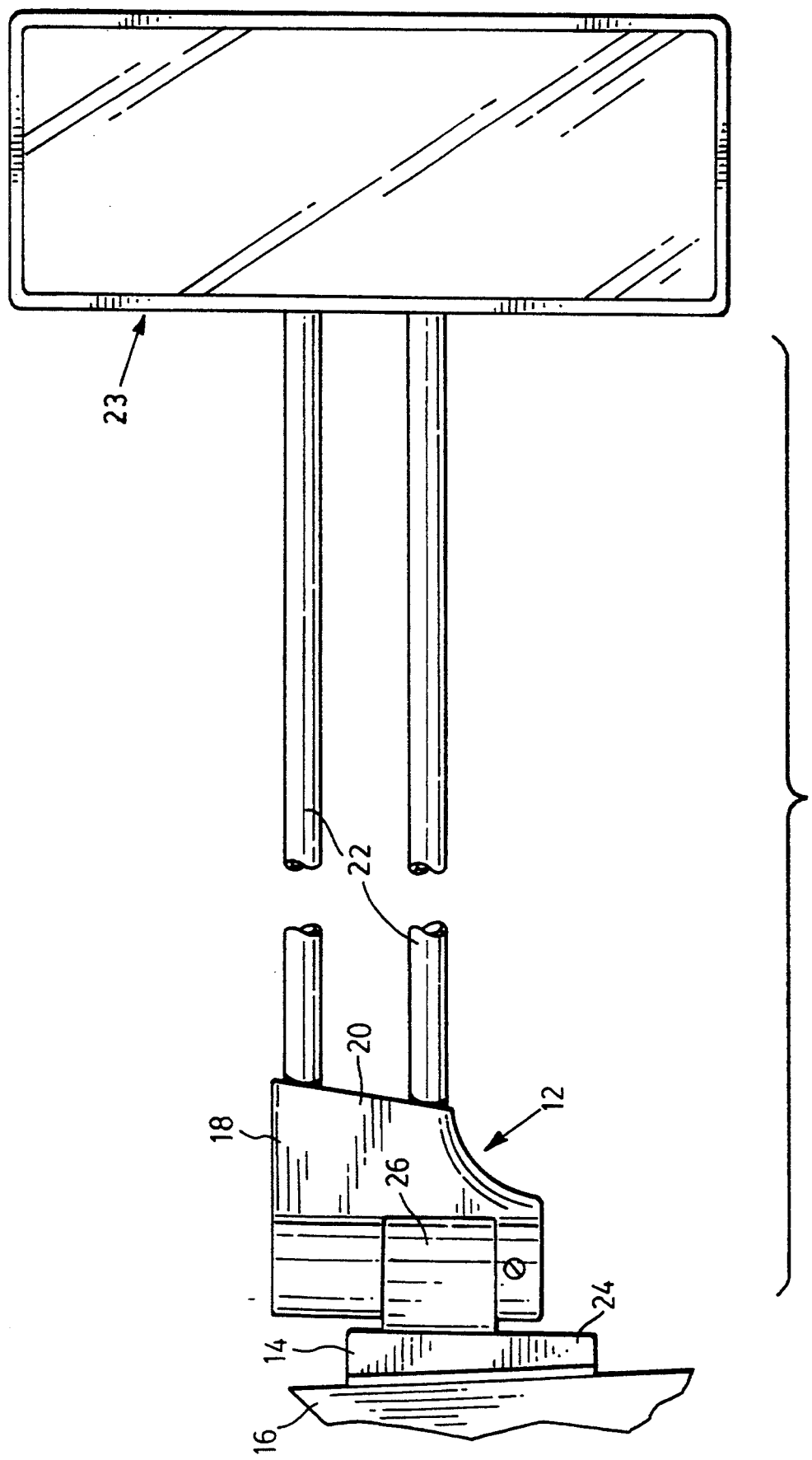

5,364,058

SPRING-LOADED BRACKET

This invention relates to spring-loaded brackets which comprise a first part securable to a support, a second part mounted on the first part for angular movement relative thereto in opposite directions from a neutral position, and a spring assembly biasing the second part to the neutral position.

Such spring-loaded brackets may be used for example as mountings for mirrors secured to the exterior of a vehicle. The first part is secured to the vehicle and a mirror is secured to the second part, the neutral position of the bracket being the preferred working position of the mirror. The capability of movement of the mirror in both directions from the neutral position enables the mirror to be deflected in either direction when encountering an obstacle, thus minimising damage that a rigidly mounted bracket would sustain.

Known spring-loaded brackets of this kind are for one reason or another not particularly satisfactory, and it is therefore an object of the present invention to provide an improved spring-loaded bracket of this type.

According to the invention, the spring assembly comprises a helical torsion spring carried by the first part and having first and second end portions at opposite ends, a first stop carried by the first part to limit movement of the first spring end portion in a spring unwinding direction, and a second stop carried by the first part to limit movement of the second spring end portion in a spring unwinding direction. The second part has a first abutment engaging the first spring end portion so as to deflect the first spring end portion in a spring winding direction when the second part is moved angularly relative to the first part in one direction from the neutral position, and the second part has a second abutment engaging the second spring end portion so as to deflect the second spring end portion in a spring winding direction when the second part is moved angularly relative to the first part in the opposite direction from the neutral position.

Thus, a single torsion spring provides the restoring force when the second part is deflected in either direction from the neutral position, thereby enabling a simple and satisfactory double-acting spring bracket to be provided.

The first part may comprise a tubular sleeve containing the helical coil spring and carrying first and second stops, the second part having a first spindle member rotatably mounted in a first end of the sleeve and carrying the first abutment, and the second part also having a second spindle member rotatably mounted in the second end of the sleeve and carrying the second abutment.

The second part may be releasably secured in the neutral position by a detent assembly, the detent assembly comprising a detent slidably mounted in the second part and resiliently urged by a spring in the second part into a recess in the tubular sleeve of the first part when the second part is in the neutral position.

Figure 2:
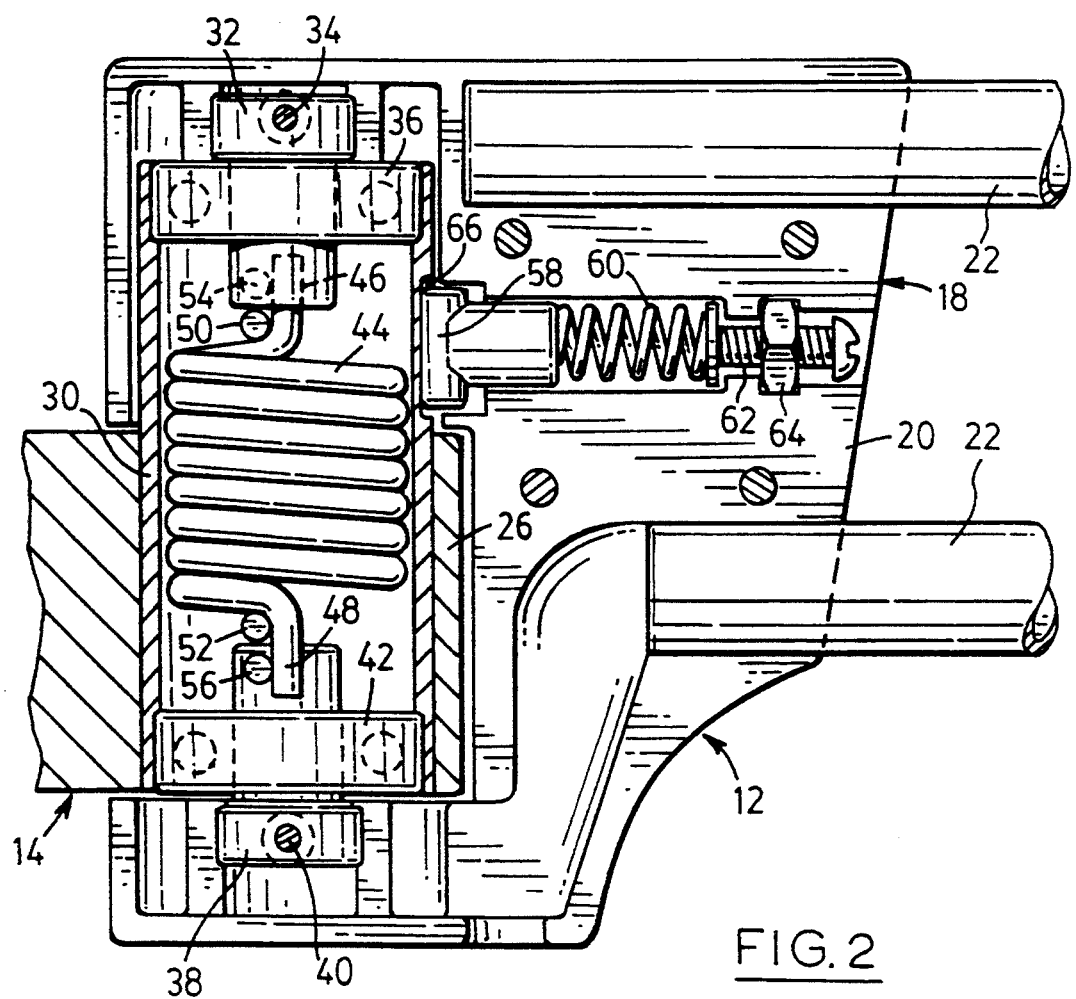
Figure 3:
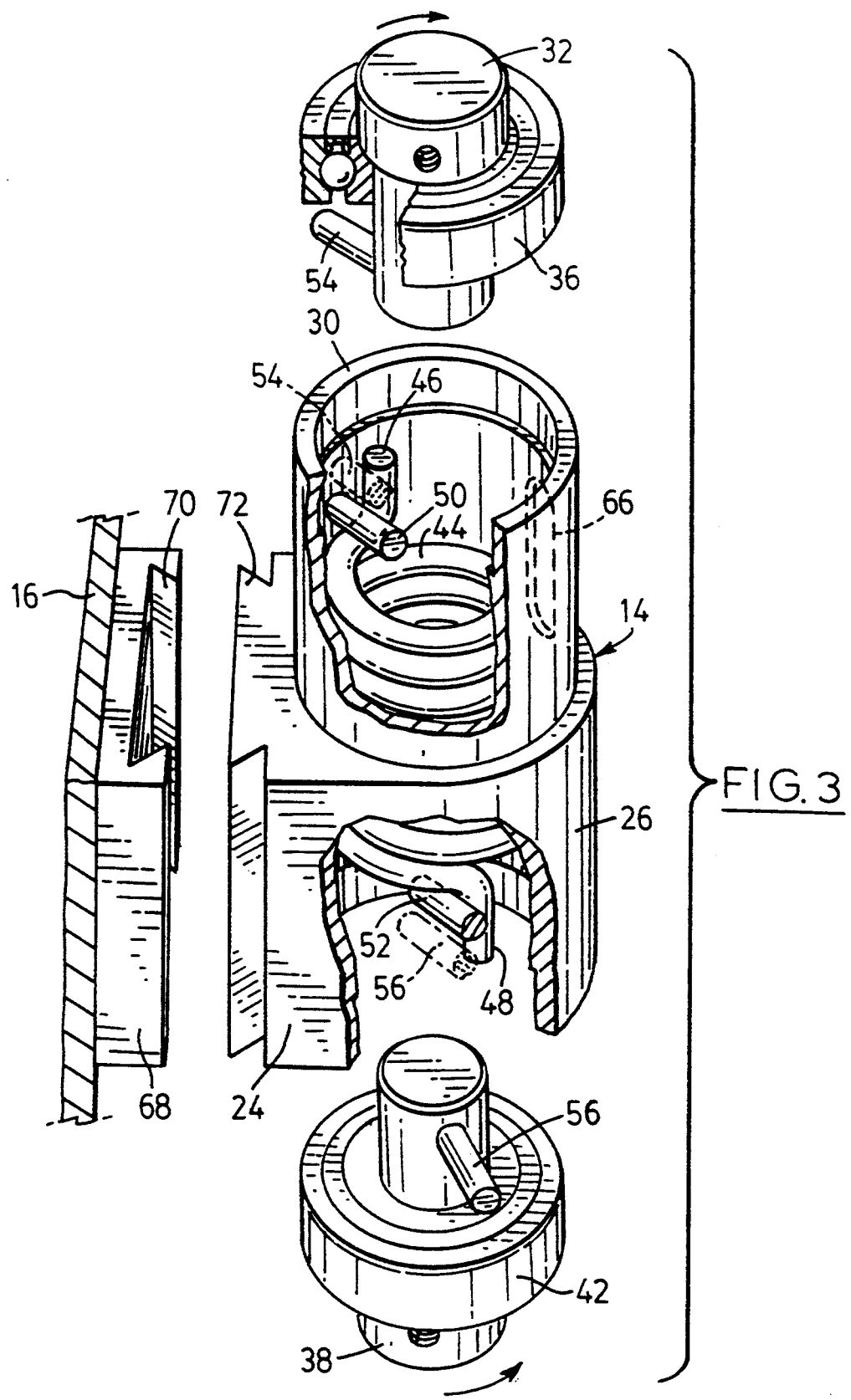

One embodiment of the invention will now be described, by way of example, with reference to the accompanying drawings, of which:

FIG. 1 is a rear view of a spring-loaded mirror bracket in accordance with one embodiment of the invention secured to the side of a vehicle, FIG. 2a is a plan view of the bracket, FIG. 2 is a partly sectional rear view of the bracket, and FIG. 3 an exploded perspective view of the spring assembly and associated parts of the bracket, with the side of the vehicle also being shown.

Referring to the drawing, a spring-loaded bracket 12 comprises a first part 14 secured to the side 16 of a vehicle in any convenient manner, and a second part 18 mounted on the first part 14 for angular movement relative thereto. The second part 18 comprises a housing 20 from which a pair of vertically spaced mirror support arms 22 extend. A mirror 23 is secured to the ends of the arms 22 remote from the housing 20.

The first part 14 has a main body 24 secured to the vehicle side 16 and an extension 26 projecting from the main body 24. The extension 26 carries a vertical tubular sleeve 30 which extends from the bottom of the extension 26 and projects above the top thereof, the tubular sleeve 30 being secured in a fixed position in the extension 26 in any suitable manner.

The housing 20 of the second part 18 extends above and below the extension 26 of the first part 14. An upper spindle member 32 is secured in a fixed position by screws 34 in the housing 20 above the extension 26, the spindle member 32 passing through a cylindrical ball bearing assembly 36 mounted in the upper end of the tubular sleeve 30 so that the spindle member 32 can rotate relative thereto. Similarly, a lower spindle member 38 is secured in a fixed position by screws 40 in the housing 20 below the extension 26, the spindle member 38 passing through a cylindrical ball bearing assembly 42 mounted in the lower end of the tubular sleeve 30 so that the spindle member 38 can rotate relative thereto. Thus, the second part 18 is mounted on the first part 14 for angular movement about a vertical axis relative thereto.

The tubular sleeve 30 contains a helical torsion spring 44 with upper and lower end portion 46,48 formed to extend parallel to the longitudinal axis of the spring. An upper stop pin 50 secured to the tubular sleeve 30 engages the upper spring end portion 46 to limit movement of the upper spring end portion 46 in a spring unwinding direction. A lower stop pin 52 secured to the tubular sleeve 30 engages the lower spring end portion 48 to limit movement of the lower spring end portion 48 in a spring unwinding direction.

The upper spindle member 32 has an abutment pin 54 which engages the upper spring end portion 46 on the same side thereof as the upper stop pin 50, and the lower spindle member 38 has an abutment pin 56 which engages the lower spring end portion 48 on the same side thereof as the lower stop pin 52.

The second part 18 is reinforcably retained in the neutral position (shown in FIG. 2) by a detent 58 slidably mounted in the housing 20 and resiliently urged by a spring 60 towards the tubular sleeve 30. The force exerted by spring 60 on the detent 58 is adjustable by an adjustment screw 62 threaded through a nut 64 non-rotatably mounted in the housing 20. In the neutral position, the detent 58 is engaged in a groove 66 in the sleeve 30.

FIG. 3 shows how the spring bracket 12 may be secured to a vehicle. A mounting plate 68 with a vertical dovetail groove 70 is secured to the vehicle side 16, and the body 24 of the first part 14 is provided with a complementarily shaped tongue 72 which slides into groove 70.

FIG. 2 shows the spring bracket 12 in the neutral position, i.e. with the detent 58 engaged in the groove 66 and with a suitable pre-loading in the spring 60. If the second part 18 with the attached mirror is deflected rearwardly (i.e. upwardly out of the plane of FIG. 2), consequent movement of upper abutment pin 54 deflects the upper spring end portion 46 away from upper stop 50 to tension the spring 44, with detent 58 being released fro groove 66 by such movement. Thus, the greater the angle of movement of the second part 18, the greater the tensioning of spring 30. Although the lower abutment pin 56 moves away from the lower spring end portion 48, the lower spring end portion 48 is retained in position by lower stop 52.

When the force deflecting second part 18 is removed, the tension in spring 44 acts on upper abutment pin 54 to return the second part 18 to the original neutral position shown in FIG. 2.

Similarly, if the second part 18 is deflected forwardly (i.e. downwardly out of the plane of FIG. 2), consequent movement of lower abutment pin 56 deflects the lower spring end portion 48 away from lower stop 52 to tension spring 44, with detent 58 being released from groove 66 by such movement. Thus, the greater the angular movement of part 18, the greater the tensioning of spring 44. Although the upper abutment pin 54 moves away from upper spring end portion 46, upper spring end portion 46 is retained in position by upper stop 50.

In the force deflecting second part 18 is removed, the tension in spring 44 acts on abutment pin 56 to return the second part 18 to the neutral position shown in FIG. 2.

The simplicity and satisfactory nature of a spring-loaded bracket in accordance with the present invention will be clear to a person skilled in the art from the foregoing description of a preferred embodiment.

Other embodiments of the invention will also be readily apparent to a person skilled in the art, the scope of the invention being defined in the appended claims.

I claim:

1. A spring-loaded bracket comprising a first part securable to a support, a second part mounted on the first part for angular movement relative thereto in opposite directions from a neutral position and a spring assembly biasing the second part to the neutral position, said spring assembly comprising a helical torsion spring carried by the first part and having first and second end portions at opposite ends, a first stop carried by the first part to limit movement of the first spring end portion in a spring unwinding direction, and a second stop carried by the first part to limit movement of the second spring end portion in a spring unwinding direction, said second part having a first abutment engaging the first spring end portion so as to deflect the first spring end portion in a spring winding direction when the second part is moved angularly relative to the first part in one direction from the neutral position, and said second part having a second abutment engaging the second spring end portion so as to deflect the second spring end portion in a spring winding direction when the second part is moved angularly relative to the first part in the opposite direction from the neutral position.

said first part comprising a tubular sleeve containing said helical coil spring, said tubular sleeve carrying said first and second stops within said sleeve, said second part having a portion adjacent a first end of the sleeve and a first spindle member projecting therefrom into the first end of the sleeve and rotatably mounted therein, said first spindle member carrying the first abutment, and said second part also having a portion adjacent a second end of the sleeve and a second spindle member projecting therefrom into the second end of the sleeve and rotatably mounted therein, said second spindle member carrying the second abutment.

2. A spring-loaded bracket accordingly to claim 1 wherein the second part is releasably secured in the neutral position by a detent assembly, said detent assembly comprising a detent slidably mounted in the second part and resiliently urged by a spring in the second part into a recess in the tubular sleeve in the first part when the second part is in the neutral position.

* * * * *